(12) United States Patent
Jacobson et al.

(10) Patent No.: US 9,407,150 B2
(45) Date of Patent: Aug. 2, 2016

(54) HIGH EFFICIENCY ZERO-VOLTAGE SWITCHING (ZVS) ASSISTANCE CIRCUIT FOR POWER CONVERTER

(71) Applicants: Raytheon Company, Waltham, MA (US); The Regents of the University of Colorado, a body corporate, Denver, CO (US)

(72) Inventors: Boris S. Jacobson, Westford, MA (US); Regan A. Zane, North Logan, UT (US); Daniel F. Seltzer, Boulder, CO (US)

(73) Assignees: Raytheon Company, Waltham, MA (US); The Regents of the University of Colorado, a body of corporate, Denver, CO (US)

( * ) Notice: Subject to any disclaimer, the term of this patent is extended or adjusted under 35 U.S.C. 154(b) by 291 days.

(21) Appl. No.: 14/020,474

(22) Filed: Sep. 6, 2013

(65) Prior Publication Data
US 2015/0070943 A1    Mar. 12, 2015

(51) Int. Cl.
| | |
|---|---|
| *H02M 3/28* | (2006.01) |
| *H02M 3/335* | (2006.01) |
| *H02M 1/00* | (2006.01) |
| *H02M 3/337* | (2006.01) |

(52) U.S. Cl.
CPC .............. *H02M 3/285* (2013.01); *H02M 3/337* (2013.01); *H02M 3/33569* (2013.01); *H02M 2001/0058* (2013.01); *Y02B 70/1491* (2013.01)

(58) Field of Classification Search
CPC ................. H02M 1/34; H02M 7/5387; H02M 2001/346; H02M 2001/0058; H02M 3/285
See application file for complete search history.

(56) References Cited

U.S. PATENT DOCUMENTS

| | | | | |
|---|---|---|---|---|
| 3,657,678 | A | * | 4/1972 | Schwenden .................... 336/160 |
| 4,691,270 | A | * | 9/1987 | Pruitt .......................... 363/56.05 |
| 4,855,888 | A | * | 8/1989 | Henze et al. ..................... 363/17 |
| 4,876,635 | A | * | 10/1989 | Park et al. ........................ 363/17 |
| 4,931,716 | A | * | 6/1990 | Jovanovic et al. ............. 323/285 |
| 5,781,419 | A | | 7/1998 | Kutkut et al. |
| 5,959,438 | A | * | 9/1999 | Jovanovic et al. ............. 323/222 |
| 6,181,295 | B1 | * | 1/2001 | Sharaiha et al. ............... 343/895 |

(Continued)

OTHER PUBLICATIONS

Boris S. Jacobson et al., "Series Resonant Converter with Clamped Tank Capacitor Voltage", 1990 IEEE, p. 137-146.

(Continued)

*Primary Examiner* — Timothy J Dole
*Assistant Examiner* — Yusef Ahmed

(57) ABSTRACT

A system includes a power converter configured to convert input power into output power. The power converter includes first and second converter bridges, where each converter bridge includes multiple transistors. The system also includes a zero-voltage switching (ZVS) assistance circuit having first and second inverse controlled rectifiers (ICRs). Each of the first and second ICRs is configured to provide current to the transistors in the first and second converter bridges. The system further includes a controller configured to control operation of the first and second converter bridges and the ZVS assistance circuit. The controller could include a phase-shift modulation (PSM) controller configured to control the converter bridges and a pulse width modulation (PWM) controller configured to control the ZVS assistance circuit. The PWM controller can be configured to apply pre-shaped voltages to transistors in regulators of the ICRs to enable substantially zero-loss turn-off commutation of the transistors in the regulators.

20 Claims, 17 Drawing Sheets

(56) References Cited

U.S. PATENT DOCUMENTS

| | | | | |
|---|---|---|---|---|
| 6,348,848 | B1* | 2/2002 | Herbert | 336/178 |
| 6,469,919 | B1* | 10/2002 | Bennett | 363/56.02 |
| 6,650,551 | B1* | 11/2003 | Melgarejo | 363/16 |
| 6,873,138 | B2 | 3/2005 | Jacobson | |
| 7,869,237 | B1* | 1/2011 | Schutten et al. | 363/132 |
| 8,004,867 | B2* | 8/2011 | Nakahori | 363/56.05 |
| 8,149,064 | B2* | 4/2012 | Paul et al. | 330/310 |
| 2003/0198067 | A1* | 10/2003 | Sun et al. | 363/53 |
| 2004/0257272 | A1* | 12/2004 | Jacobson | 342/175 |
| 2005/0024179 | A1* | 2/2005 | Chandrasekaran et al. | 336/212 |
| 2005/0185429 | A1* | 8/2005 | Vinciarelli | 363/65 |
| 2005/0185430 | A1* | 8/2005 | Vinciarelli | 363/65 |
| 2005/0226012 | A1* | 10/2005 | Jovanovic et al. | 363/59 |
| 2005/0254272 | A1* | 11/2005 | Vinciarelli | 363/65 |
| 2005/0270812 | A1* | 12/2005 | Vinciarelli | 363/65 |
| 2008/0123374 | A1* | 5/2008 | Vinciarelli | 363/65 |
| 2009/0021081 | A1* | 1/2009 | Jacobson et al. | 307/77 |
| 2009/0021966 | A1* | 1/2009 | Jacobson et al. | 363/52 |
| 2009/0290383 | A1* | 11/2009 | Zhou et al. | 363/16 |
| 2010/0231284 | A1* | 9/2010 | Jacobson et al. | 327/307 |
| 2011/0101951 | A1* | 5/2011 | Zhang et al. | 323/305 |
| 2011/0149611 | A1* | 6/2011 | Moussaoui et al. | 363/21.04 |
| 2011/0317452 | A1* | 12/2011 | Anguelov et al. | 363/21.02 |
| 2012/0194313 | A1* | 8/2012 | Wohlforth | 336/170 |
| 2012/0313430 | A1* | 12/2012 | Wu et al. | 307/9.1 |
| 2013/0234526 | A1* | 9/2013 | Jacobson et al. | 307/104 |
| 2013/0242617 | A1* | 9/2013 | Zhang et al. | 363/17 |
| 2014/0320007 | A1* | 10/2014 | Stamm et al. | 315/51 |
| 2015/0015356 | A1* | 1/2015 | Jacobson et al. | 336/73 |
| 2015/0023063 | A1* | 1/2015 | Perreault et al. | 363/17 |
| 2015/0029758 | A1* | 1/2015 | Jacobson et al. | 363/17 |

OTHER PUBLICATIONS

Luca Corradini, et al., "Zero Voltage Switching Technique for Bi-Directional DC/DC Converters", 2011 IEEE, p. 2215-2222.

R.W. De Doncker, et al., "The Auxiliary Resonant Commutated Pole Converter", 1990 IEEE, p. 1228-1235.

Kunrong Wang, et al., "Operation Principles of Bi-Directional Full-Bridge DC/DC Converter with Unified Soft-Switching Scheme and Soft-Starting Capability", 2000 IEEE, p. 111-118.

Kunrong Wang, et al., "Design, Implementation, and Experimental Results of Bi-Directional Full-Bridge DC/DC Converter with Unified Soft-Switching Scheme and Soft-Starting Capability", 2000 IEEE, p. 1058-1063.

Dehong Xu, et al., "A PWM Plus Phase-Shift Control Bidirectional DC-DC Converter", IEEE Transactions on Power Electronics, vol. 19, No. 3, May 2004, p. 666-675.

Huafeng Xiao, et al., "A New ZVS Bidirectional DC-DC Converter With Phase-Shift Plus PWM Control Scheme", 2007 IEEE, p. 943-948.

German G. Oggier, et al., "Extending the ZVS Operating Range of Dual Active Bridge High-Power DC-DC Converters", 2006, 7 pages.

German G. Oggier, et al., "Switching Control Strategy to Minimize Dual Active Bridge Converter Losses", IEEE Transactions on Power Electronics, vol. 24, No. 7, Jul. 2009, p. 1826-1838.

Hua Bai, et al., "Eliminate Reactive Power and Increase System Efficiency of Isolated Bidirectional Dual-Active-Bridge DC-DC Converters Using Novel Dual-Phase-Shift Control", IEEE Transactions on Power Electronics, Vo. 23, No. 6, Nov. 2008, p. 2905-2914.

Nikolaus Schibli, "Symmetrical Multilevel Converters with Two Quadrant DC-DC Feeding", 2000, 172 pages.

* cited by examiner

HIGH EFFICIENCY ZERO-VOLTAGE SWITCHING (ZVS) ASSISTANCE CIRCUIT FOR POWER CONVERTER

GOVERNMENT LICENSE RIGHTS

This invention was made with government support under Contract No. N00014-09-D-0726 awarded by the United States Navy. The U.S. government has certain rights in the invention.

TECHNICAL FIELD

This disclosure is generally directed to power converters. More specifically, this disclosure is directed to a high efficiency zero-voltage switching (ZVS) assistance circuit for a power converter.

BACKGROUND

Power converters are used to convert electrical energy from one form to another form. For example, direct current-to-direct current (DC-to-DC) power converters are used to convert power from one DC form to another DC form. Efficiency is often an important characteristic of power converters. Power converters with higher efficiencies dissipate less energy during the conversion process than power converters with lower efficiencies. This can have significant impact on, for example, the length of time that a device can be used before recharging of a power supply in the device is needed.

Switched mode power converters repeatedly turn various transistors on and off to control the conversion of power from one form to another. Phase shift modulation (PSM) is one type of control technique that can be used to control the transistors in a switched mode power converter. PSM control can maintain low switching losses and low noise by operating in a "zero-voltage switching" (ZVS) mode of operation. In this mode, transistors are switched on and off at or near a zero voltage, which can help to reduce or minimize switching losses in the transistors. Combined with high switching frequencies, ZVS can be used to achieve compact and low-loss power converters.

Unfortunately, there are various problems associated with conventional power converters that operate using zero-voltage switching. For example, losses within conventional power converters typically increase when lighter loads are connected to the power converters. Also, conventional power converters can experience excessive reactive power at higher input levels. One method of providing ZVS introduces a source of additional inductive (lagging) current into switching nodes of a PSM-controlled power converter. This approach helps to increase the power converter's efficiency at lighter loads, but it also typically compromises the power converter's efficiency at mid-range loads and full loads. This approach also does not address the problem of reducing reactive power processed by a power converter at higher input levels.

SUMMARY

This disclosure provides a high efficiency zero-voltage switching (ZVS) assistance circuit for a power converter.

In a first embodiment, an apparatus includes a power converter configured to convert input power into output power. The power converter includes first and second converter bridges, where each converter bridge includes multiple transistors. The apparatus also includes a zero-voltage switching (ZVS) assistance circuit having first and second inverse controlled rectifiers (ICRs). Each of the first and second ICRs is configured to provide current to the transistors in the first and second converter bridges.

In a second embodiment, a system includes a power converter configured to convert input power into output power. The power converter includes first and second converter bridges, where each converter bridge includes multiple transistors. The system also includes a zero-voltage switching (ZVS) assistance circuit having first and second inverse controlled rectifiers (ICRs). Each of the first and second ICRs is configured to provide current to the transistors in the first and second converter bridges. The system further includes a controller configured to control operation of the first and second converter bridges and the ZVS assistance circuit.

In a third embodiment, a method includes converting input power into output power using first and second converter bridges of a power converter. Each converter bridge includes multiple transistors. The method also includes providing current to the transistors in the first and second converter bridges using a zero-voltage switching (ZVS) assistance circuit. The ZVS assistance circuit includes first and second inverse controlled rectifiers (ICRs) that provide the current.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 16, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

This disclosure provides a zero-voltage switching (ZVS) assistance topology that uses Inverse Controlled Rectifiers (ICRs) and a related system and method. The ZVS assistance topology disclosed here helps to resolve various problems associated with conventional circuits, such as a loss of efficiency at lighter loads and excessive reactive power at higher input levels. Moreover, the ZVS assistance topology disclosed here provides additional advantages, such as improved reliability and efficiency, compared to conventional circuits.

FIGS. 1 through 3B illustrate an example power converter 100 with a high efficiency zero-voltage switching (ZVS) assistance circuit and related details according to this disclosure. In this example, the power converter 100 generally receives a direct current (DC) input defined across two input pins $DC_{IN}$ and $DC_{IN}$ Return. The power converter 100 converts the DC input into a DC output defined across two output pins $DC_{OUT}$ and $DC_{OUT}$ Return. An input capacitor 102 ($C_{IN}$) is coupled across the input pins to smooth variations in the input signal. The input capacitor 102 includes any suitable capacitive structure having any suitable capacitance.

Figure 1:
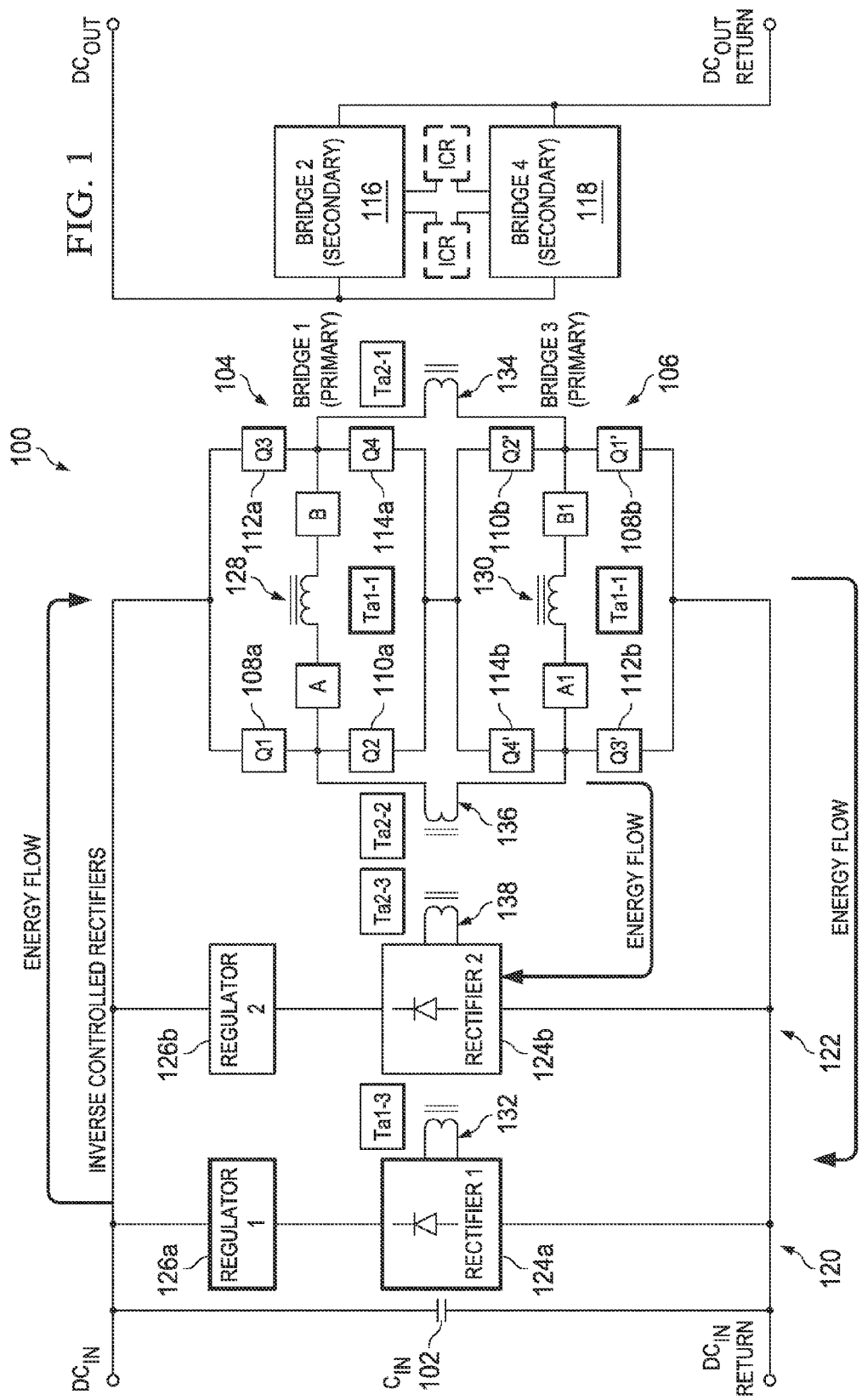
FIGS. 1 through 3B illustrate an example power converter with a high efficiency zero-voltage switching (ZVS) assistance circuit and related details according to this disclosure.

As shown in FIG. 1, the power converter 100 includes two primary series resonant converter (SRC) bridges 104-106. Each primary SRC bridge 104-106 generally denotes a circuit arrangement that causes an inductance and a capacitance to resonate in order to improve the efficiency of a power conversion. Each capacitance in the primary SRC bridges 104-106 represents any suitable capacitive structure having any suitable capacitance. Each inductance in the primary SRC bridges 104-106 represents any suitable inductive structure having any suitable inductance. Among other things, the primary SRC bridges 104-106 are used to feed first and second auxiliary transformers (denoted Ta1 and Ta2).

Each primary SRC bridge 104-106 also includes four transistors 108a-114a (denoted Q1-Q4) and 108b-114b (denoted Q1'-Q4'), respectively. The transistors 108a-110a are coupled to node A in the SRC bridge 104, and transistors 112a-114a are coupled to node B in the SRC bridge 104. The transistors 108b-110b are coupled to node A1 in the SRC bridge 106, and transistors 112b-114b are coupled to node B1 in the SRC bridge 106. The transistors 108a-114a, 108b-114b can be switched on and off to control the power conversion in the converter 100. Each transistor 108a-114a, 108b-114b includes any suitable switching device, such as a metal oxide semiconductor field effect transistor (MOSFET) or an insulated-gate bipolar transistor (IGBT).

The power converter 100 also includes two secondary SRC bridges 116-118. The secondary bridges 116-118 receive electrical power from the primary bridges 104-106, respectively, via two main transformers (not shown). The secondary bridges 116-118 output the electrical power as the DC output of the power converter 100. Each secondary bridge 116-118 includes any suitable structure for receiving and outputting electrical power.

The power converter 100 further includes two Inverse Controlled Rectifiers (ICRs) 120-122. The ICR 120 is fed by the first auxiliary transformer, and the ICR 122 is fed by the second auxiliary transformer. The ICR 120-122 include rectifiers 124a-124b, respectively, and regulators 126a-126, respectively. Each rectifier 124a-124b receives a voltage from the associated auxiliary transformer and rectifies the voltage. Each regulator 126a-126b regulates the current flowing through the associated ICR 120-122. Each rectifier 124a-124b includes any suitable structure for rectifying a signal, such as an uncontrolled bridge rectifier. Each regulator 126a-126b includes any suitable structure for regulating a current flow, such as a pulse width modulation (PWM) controlled MOSFET or IGBT. Note, however, that each ICR 120-122 could be implemented using any other converter topology, such as a buck converter topology.

As noted above, the power converter 100 includes first and second auxiliary transformers. The first auxiliary transformer is formed using transformer windings 128-132 (denoted Ta1-1 through Ta1-3). The transformer winding 128 is coupled between the transistors 108a-110a and the transistors 112a-114a in the SRC bridge 104, and the transformer winding 130 is coupled between the transistors 108b-110b and the transistors 112b-114b in the SRC bridge 106. The transformer winding 132 is coupled to the rectifier 124a in the ICR 120. In particular embodiments, the windings 128-130 can have an equal number of turns, and the winding 132 can have a greater number of turns.

The second auxiliary transformer is formed using transformer windings 134-138 (denoted Ta2-1 through Ta2-3). The transformer winding 134 is coupled between the transistors 108a-110a in the SRC bridge 104 and the transistors 112b-114b in the SRC bridge 106. The transformer winding 136 is coupled between the transistors 108b-110b in the SRC bridge 106 and the transistors 112a-114a in the SRC bridge 104. The transformer winding 138 is coupled to the rectifier 124b in the ICR 122. In particular embodiments, the windings 134-136 can have an equal number of turns, and the winding 138 can have a greater number of turns.

The transformer windings 128-130 here are said to be coupled to SRC bridge "diagonals," meaning they would lie on diagonals of a square if the transistors 108a-114a or 108b-114b were arranged in a square configuration. The diagonals are defined as the path directly between nodes A and B in the SRC bridge 104 and the path directly between nodes A1 and B1 in the SRC bridge 106. Also, the transformer windings 134-136 here are said to be "cross-bridge" windings since they are connected to multiple SRC bridges 104-106. The cross-bridge paths are defined as the path directly between nodes A and A1 in the SRC bridges 104-106 and the path directly between nodes B and B1 in the SRC bridges 104-106.

In this arrangement, the primary SRC bridges 104-106 and the transformer windings form an inductor-linked dual SRC design. The ICRs 120-122 represent regulated inverse rectifiers connected to an input source (the source providing the input voltage). During operation, energy flows from the input source through the primary SRC bridges 104-106. This creates a voltage and a current flow in the secondary bridges 116-118, providing the DC output. Part of the energy flowing through the primary SRC bridges 104-106 can flow into the ICRs 120-122 via the transformer windings. The ICRs 120-122 therefore take energy from the switching nodes A, A1, B, and B1 and send it back to the input source. The reactive ("circulating") energy flow provides ZVS assistance to the primary SRC bridges 104-106 when needed.

As noted above, each regulator 126a-126b could be implemented using a transistor, such as a PWM-controlled MOSFET or IGBT. To help reduce power losses in the power converter 100, pre-shaped voltages can be applied to the transistors forming the regulators 126a-126b. The pre-shaped voltages can enable zero-loss or substantially zero-loss turn-off commutation for the transistors forming the regulators 126a-126b. If the regulators 126a-126b operate with discontinuous currents, their dominant switching losses can be caused by the discharge of their equivalent capacitances at turn-on. The pre-shaped voltages feeding the regulators 126a-126b can be derived from the primary SRC bridges 104-106.

Figure 2:
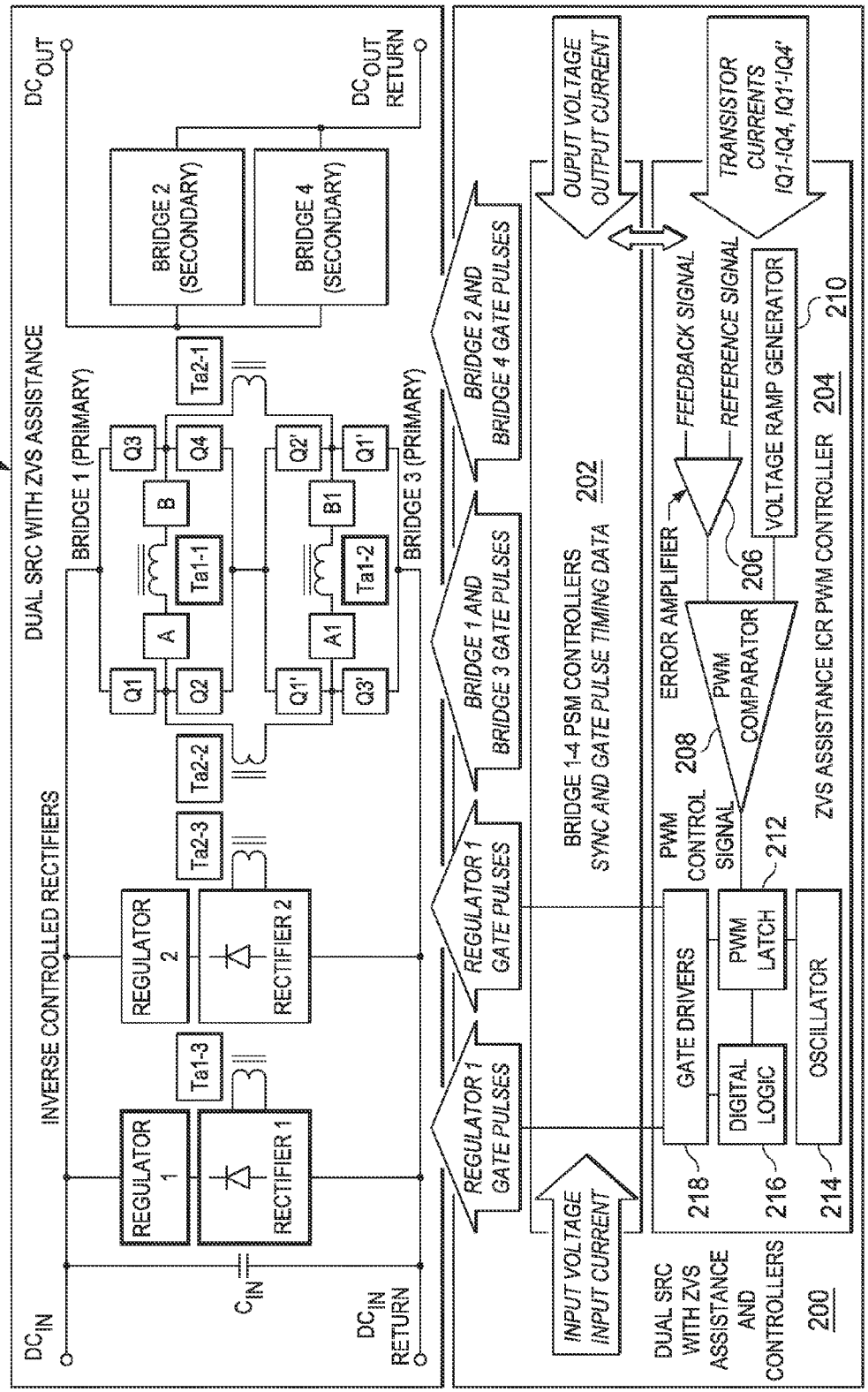

FIG. 2 illustrates the power converter 100 along with associated control circuitry 200. The control circuitry 200 in this example includes a PSM controller 202 for the bridges 104-106, 116-118 and a PWM controller 204 for the regulators 126a-126b. The PSM controller 202 receives measurements of the power converter's input and output voltages and input and output currents. Using that information, the PSM controller 202 generates gate pulses for controlling the various transistors in the bridges 104-106, 116-118. The PSM controller 202 includes any suitable structure for controlling other structures using phase-shift modulation.

The PWM controller 204 receives a feedback signal, such as one or more direct measurements of the currents flowing through the transistors 108a-114a, 108b-114b in the primary SRC bridges 104-106. For each feedback signal, an error amplifier 206 amplifies a difference between the feedback signal and a reference signal, and a comparator 208 compares an output of the error amplifier 206 to an output of a voltage ramp generator 210. A latch 212 captures an output of the comparator 208 based on a clock signal from an oscillator 214. Digital logic 216 processes the captured comparator output, and gate drivers 218 are used to drive the transistors in the regulators 126a-126b. The PWM controller 204 includes any suitable structure for controlling other structures using pulse width modulation.

In some embodiments, the regulators' currents in the ICRs 120-122 lead the corresponding SRC currents in the primary SRC bridges 104-106, so the PWM controller 204 controls the ICRs 120-122 using leading-edge PWM control. The error amplifier 206 can compare the measured transistor currents with reference values corresponding to the charges used to provide ZVS of the given nodes (A, A1, B, and B1). Each pair of transistors in the primary SRC bridges 104-106 (Q1 and Q1', Q2 and Q2', Q3 and Q3', and Q4 and Q4') can be driven using identical gate drive signals.

As can be seen in FIG. 2, the bridges 104-106 and 116-118 can be controlled using phase-shift modulation, while the regulators 126a-126b can be controlled using pulse width modulation. The pulse width modulation is used to ensure that the ICRs 120-122 provide assistance currents when needed, and the assistance currents are independently controlled using the PWM controller 204.

Figure 3A:
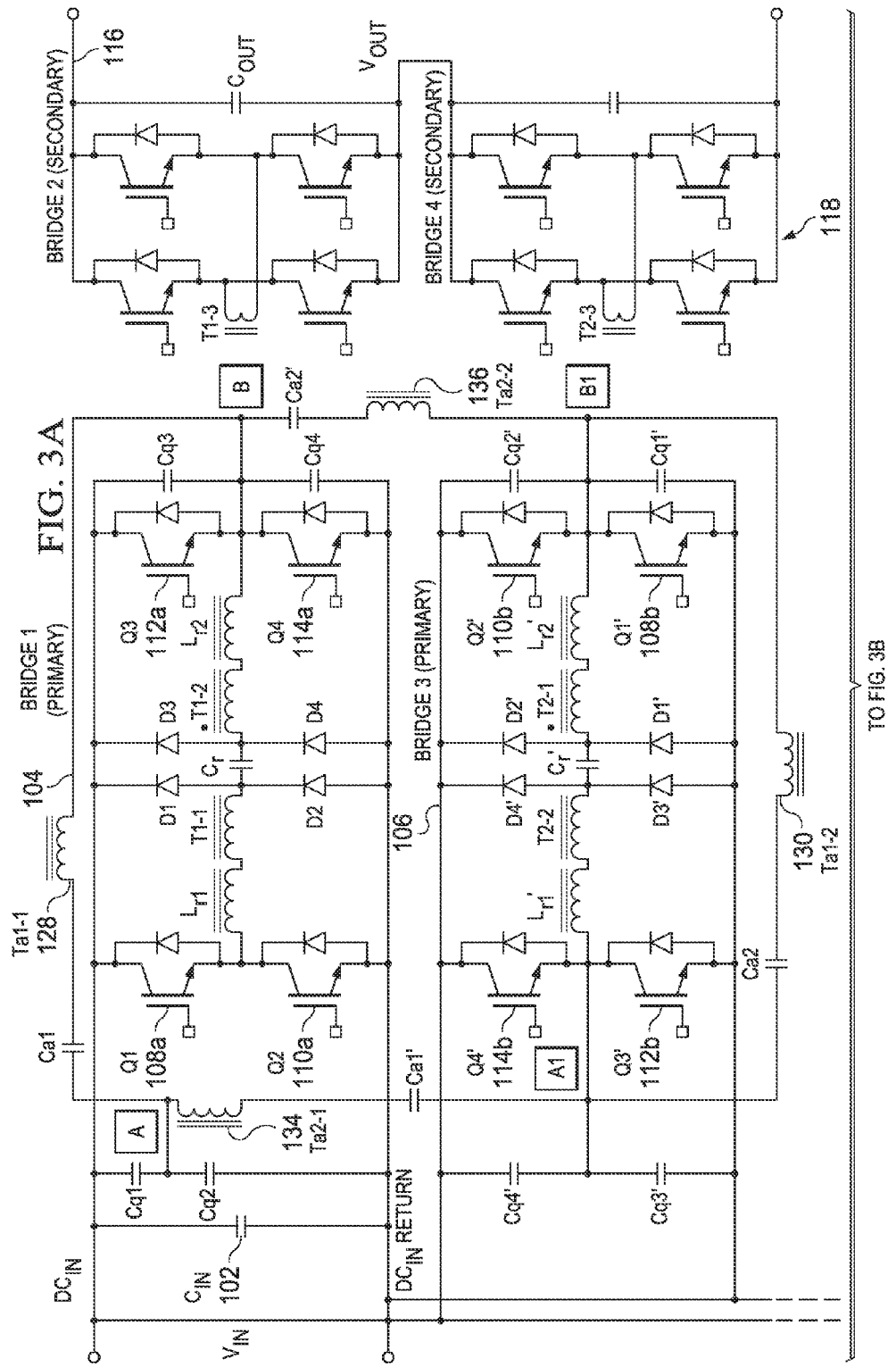
Figure 3B:
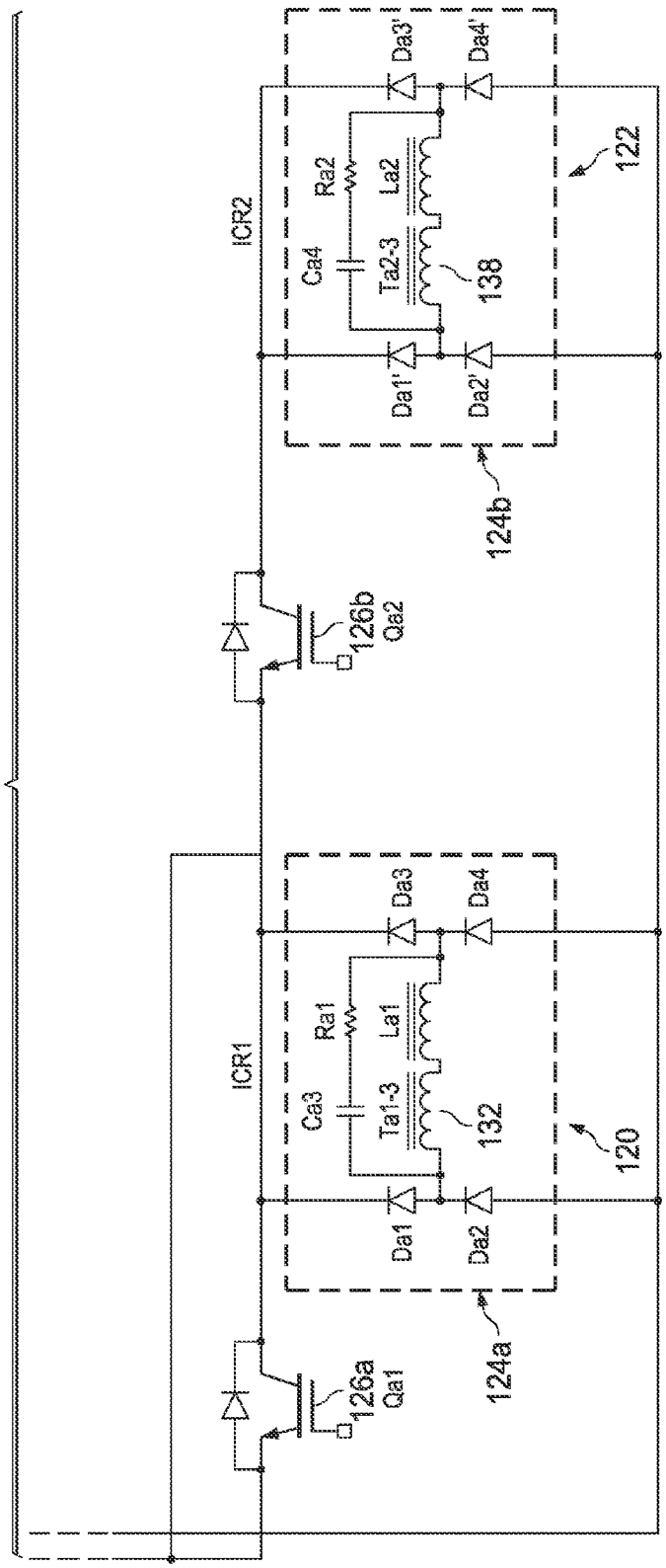

FIGS. 3A and 3B illustrate a more detailed circuit schematic of one possible implementation of the power converter 100. As shown in FIGS. 3A and 3B, an input voltage $V_{IN}$ creates the DC input across the input capacitor 102. Two series-coupled capacitors Cq1 and Cq2 are coupled to node A of the primary SRC bridge 104, and two series-coupled capacitors Cq3 and Cq4 are coupled to node B of the primary SRC bridge 104. The capacitors Cq1 and Cq2 are coupled in parallel across the transistors 108a-114a, and the capacitors Cq3 and Cq4 are coupled in parallel across the transistors 108a-114a. Additional capacitors Cq1'-Cq4' are coupled to nodes A1 and B1 of the primary SRC bridge 106 in a similar arrangement. Each transistor 108a-114a, 108b-114b in the primary SRC bridges 104-106 is also coupled in parallel with an associated diode.

The primary SRC bridge 104 also includes four additional diodes D1-D4. Diodes D1-D2 are coupled in series, and diodes D3-D4 are coupled in series. Diodes D1-D2 are also coupled to node A via a resonant inductor $L_{r1}$ and a transformer winding T1-1, which represents a winding of a first main transformer. Diodes D3-D4 are also coupled to node B via a resonant inductor $L_{r2}$ and a transformer winding T1-2, which represents another winding of the first main transformer. The diodes D1-D4 are further coupled to a resonant capacitor $C_r$. The primary SRC bridge 106 has a similar design with diodes D1'-D4', resonant inductors $L_{r1}'$ and $L_{r2}'$, and resonant capacitor $C_r'$. Also, T2-1 and T2-2 represent windings of a second main transformer.

The transformer winding 128 is coupled in series with a capacitor Ca1, and the transformer winding 130 is coupled in series with a capacitor Ca2. The transformer winding 134 is coupled in series with a capacitor Ca1' between nodes A and A1, and the transformer winding 136 is coupled in series with a capacitor Ca2' between nodes B and B1.

As shown in FIGS. 3A and 3B, the secondary bridge 116 is electrically coupled to the primary SRC bridge 104 using a transformer winding T1-3, which represents a third winding of the first main transformer. Similarly, the secondary bridge 118 is electrically coupled to the primary SRC bridge 106 using a transformer winding T2-3, which represents a third winding of the second main transformer. Each secondary bridge 116-118 is implemented using two pairs of transistors, where each transistor pair is coupled in parallel with an output capacitor $C_{OUT}$. An output voltage $V_{OUT}$ is created across the output capacitor $C_{OUT}$.

In the ICR 120, the rectifier 124a includes four diodes Da1-Da4. Diodes Da1-Da2 are coupled in series, and diodes Da3-Da4 are coupled in series. The transformer winding 132 and a capacitor Ca3 are connected to a node between the diodes Da1-Da2, and an auxiliary inductor La1 (an AC inductor) and a resistor Ra1 are connected to a node between the diodes Da3-Da4. The transformer winding 132 and the auxiliary inductor La1 are coupled in series, and the capacitor Ca3 and the resistor Ra1 are coupled in series. The rectifier 124b in the ICR 122 has the same design with diodes Da1'-Da4', capacitor Ca4, auxiliary inductor La2 (an AC inductor), resistor Ra2, and the transformer winding 138. The regulators 126a-126b in the ICRs 120-122 are formed using transistors Qa1-Qa2, respectively, each of which has a parallel-coupled diode.

In this example, the voltage $V_{A-B}$ between nodes A and B and the voltage $V_{A1-B1}$ between nodes A1 and B1 are coupled to the regulator 126a through the auxiliary transformer Ta1. This provides an assist to the leading SRC transistors Q1, Q2, Q1', and Q2'. Also, the voltage $V_{A-A1}$ between nodes A and A1 and the voltage $V_{B-B1}$ between nodes B and B1 are coupled to the regulator 126b through the auxiliary transformer Ta2. This provides an assist to the lagging SRC transistors Q3, Q4, Q3', and Q4'.

As noted above, each ICR 120-122 could be implemented using any other converter topology, such as a buck converter topology. If a buck converter topology is used, each auxiliary inductor La1-La2 in the ICRs 120-122 can be moved from the diagonal of the ICR bridge rectifier to the DC side at the output of the rectifier.

Each component shown in FIGS. 3A and 3B could be implemented in any suitable manner. For example, Table 1 provides example values or types for different components or parameters in FIGS. 3A and 3B.

TABLE 1

| Component or parameter | Value or type |
| --- | --- |
| Output power | 62.5 kW |
| Input voltage | 800 VDC |
| Output Voltage | 500 VDC |
| Switching frequency | 100 kHz |
| Resonant inductor Lr1, Lr2, Lr1' and Lr2' | 7 uH |
| Resonant capacitor Cr, Cr' | 360 nF |
| Main transformer turns ratio T1, T2 | n1:n1:n2 = 1:1:1.5 |
| Switching transistor Q1-Q4 and Q1'-Q4' | IGBT, part number 75GP12075JDF3, eight in parallel |
| Transistor parallel capacitor Cq1-Cq4 and Cq1'-Cq4" | 18 nF |
| ICR switching transistor Qa1, Qa2 | IGBT, part number 75GP12075JDF3 |
| Auxiliary inductor La1, La2 | 3.6 uH |
| ICR snubber Capacitor Ca3, Ca4 | 230 pF |
| ICR snubber resistor, Ra1, Ra2 | 200 |
| Auxiliary transformer turns ratio Ta1, Ta2 | n1:n1:n2 = 1:1:1.5 |

Note, however, that the power converter 100 could be implemented in any other suitable manner.

The power converter 100 could be used in a wide range of applications. For example, the power converter 100 could form part of a galvanically-isolated power converter. The power converter 100 could also be used in high-density power converters and micro-grids. The power converter 100 could be used in any other suitable application.

Although FIGS. 1 through 3B illustrate one example of a power converter 100 with a high efficiency ZVS assistance circuit and related details, various changes may be made to FIGS. 1 through 3B. For example, the power converter 100 in FIG. 1 uses the ICRs 120-122 connected only to the primary SRC bridges 104-106. However, ICRs could be coupled only to the secondary bridges 116-118, or ICRs could be coupled to both the primary SRC bridges 104-106 and the secondary bridges 116-118. Also, any other control circuitry could be used in conjunction with the power converter 100, and the circuitry shown in FIGS. 3A and 3B represents one example way of implementing the power converter 100 and does not limit the scope of this disclosure. Further, any type of converter bridges could be used, and the ZVS assistance circuit is not limited to use with SRC bridges. In addition, note that the numbers of components in the power converter 100 are for illustration only and other number(s) of component(s) could be used. For instance, the power converter 100 could include more than two primary SRC bridges, more than two secondary SRC bridges, and more than two ICRs.

FIGS. 4 through 15 illustrate example operational characteristics of a power converter with a high efficiency ZVS assistance circuit according to this disclosure. In particular, FIGS. 4 through 15 illustrate operational characteristics that can be achieved using a particular implementation of the power converter 100, namely the implementation shown in FIGS. 3A and 3B. Note, however, that other power converters with ZVS assistance circuits could have different operational characteristics depending on their implementations.

Figure 4:
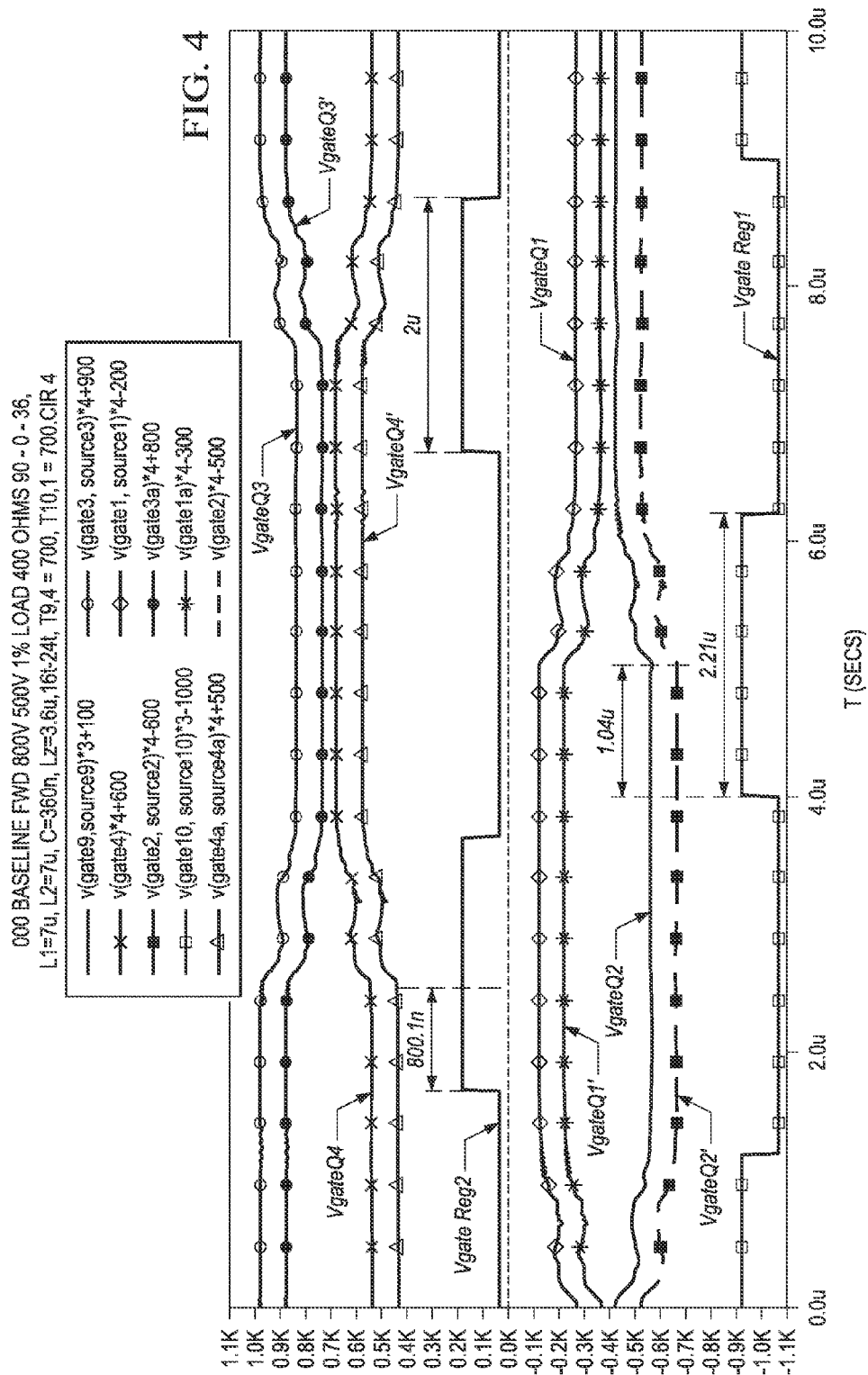
FIGS. 4 through 15 illustrate example operational characteristics of a power converter with a high efficiency ZVS assistance circuit according to this disclosure.

FIG. 4 illustrates example operation of the power converter 100 at no load or light load (such as at 1% or less of full load). Here, VgateQ1-VgateQ4 and VgateQ1'-VgateQ4' represent the voltages placed on the gates of the transistors 108a-114a, 108b-114b in the SRC bridges 104-106. Also, VReg1 and VReg2 represent the voltages across the regulators 126a-126b. When operating in this manner, the power converter 100 supplies nearly all current for recharging the capacitances (including self-capacitances) of the transistors 108a-114a, 108b-114b in the SRC bridges 104-106, and pulses in the VReg1 and VReg2 signals have a maximum width. This corresponds to the largest leading phase angle between pulses in the VReg1 and VReg2 signals and pulses in the VgateQ1-VgateQ4 and VgateQ1'-VgateQ4' signals.

Figure 5:
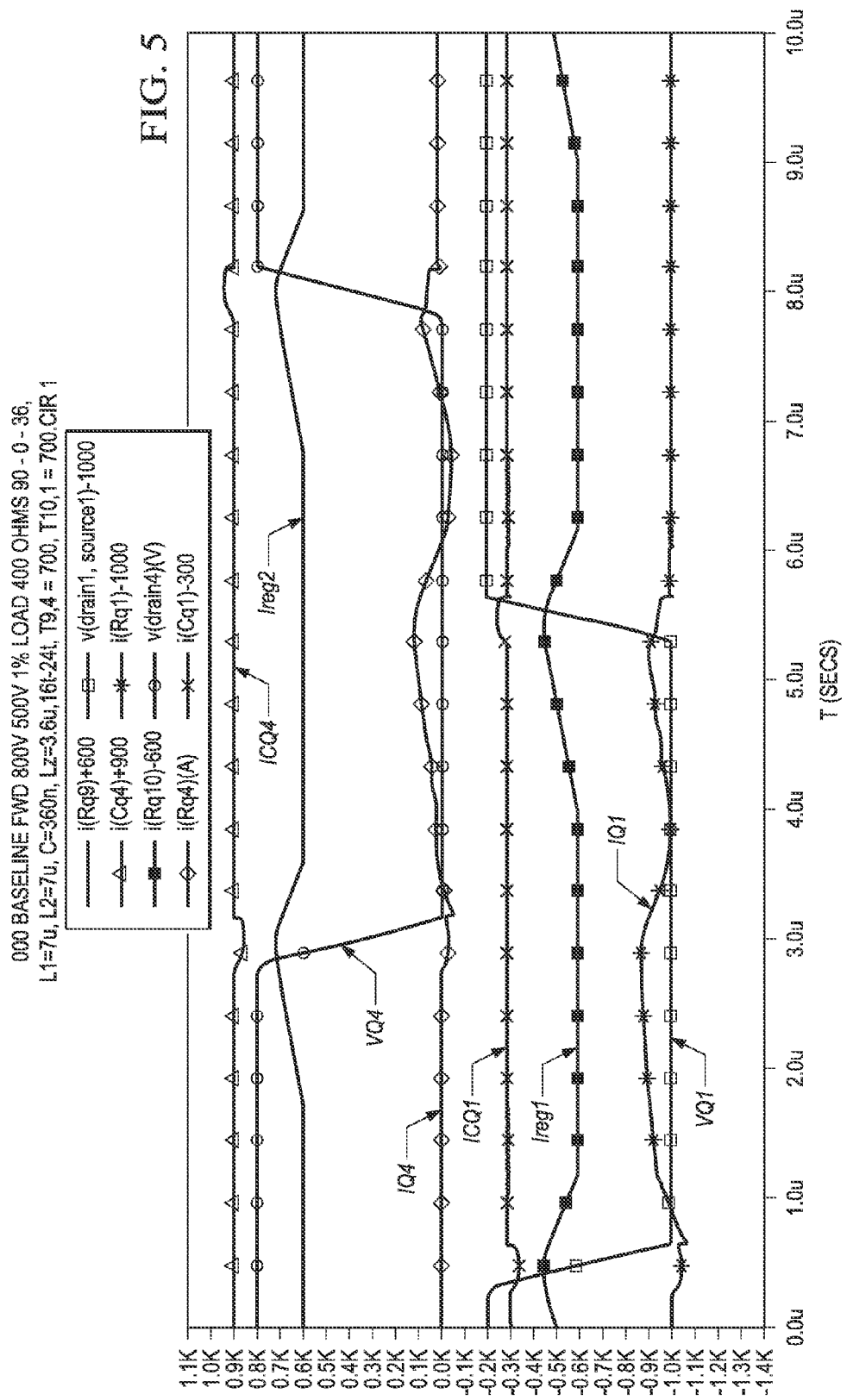

FIG. 5 illustrates the currents in the power converter 100 under no or light load. Here, IQ1 and IQ4 denote the currents through the transistors 108a/108b and 114a/114b, and VQ1 and VQ4 denote the voltages across the transistors 108a/108b and 114a/114b. Also, ICQ1 and ICQ4 denote the currents through the capacitors Cq1 and Cq4, and Ireg1 and Ireg2 denote the currents through the regulators 126a-126. As seen here, the regulator currents Ireg1 and Ireg2 start ramping up from zero ahead of the currents in the SRC transistors 108a/108b and 114a/114b. Note that the peak ZVS assistance current corresponds to the peak transistor current.

Figure 6:
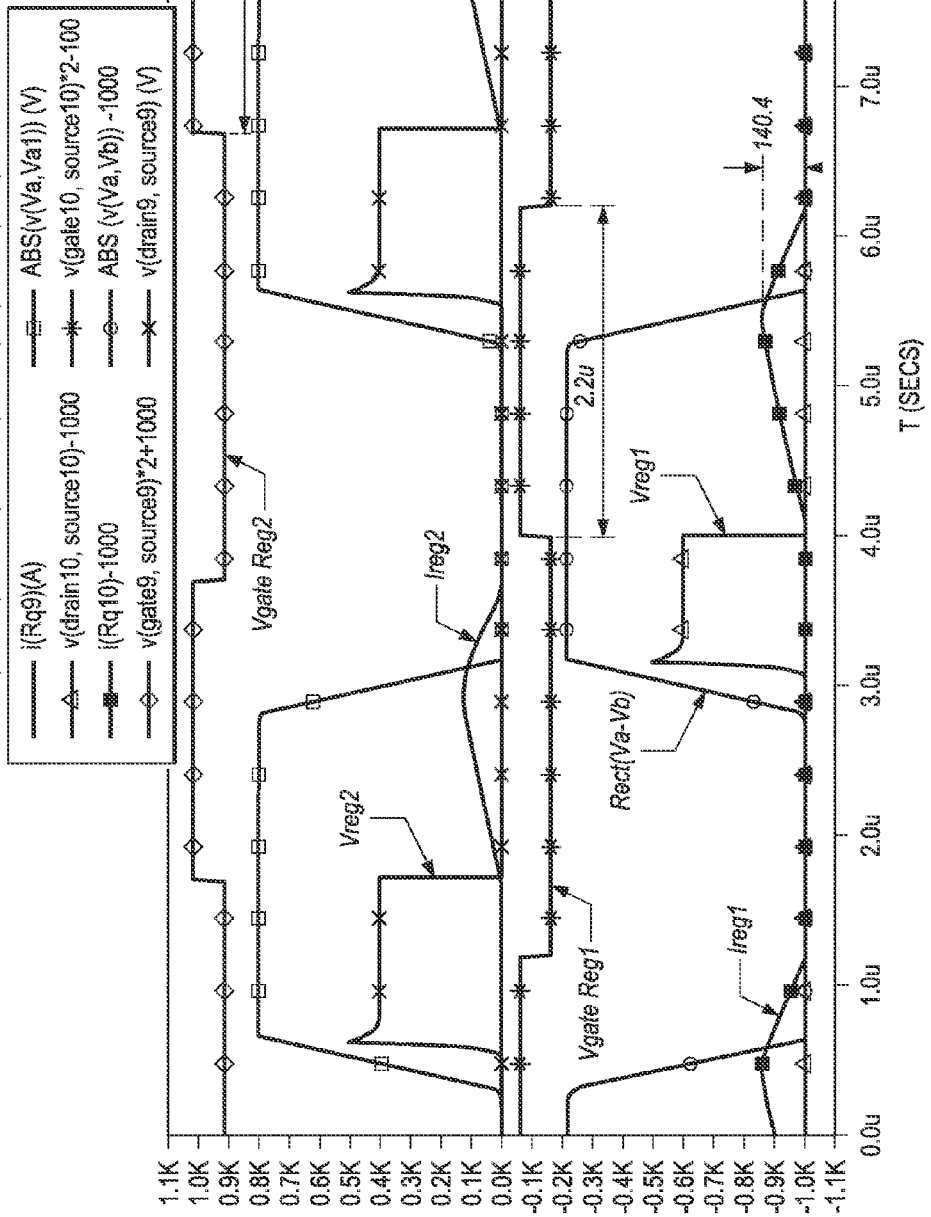

FIG. 6 illustrates operating conditions with respect to the transistors Qa1-Qa2 in the regulators 126a-126b under no or light load. Here, VgateReg1 and VgateReg2 represent the voltages placed on the gates of the transistors Qa1-Qa2 in the regulators 126a-126b, VReg1 and VReg2 represent the voltages across the regulators 126a-126b, and IReg1 and IReg2 represent the currents through the regulators 126a-126b. Also, Rect(Va–Va1) represents the rectified difference between the voltages at nodes A and A1, and Rect(Va–Vb) represents the rectified difference between the voltages at nodes A and B. As shown here, the transistors Qa1-Qa2 in the regulators 126a-126b work in discontinuous conduction. Because their drain voltages decay to zero prior to turn-off, the only source of switching losses can be the discharge of transistor capacitance at turn-on. The low switching stress allows the application of higher voltages (and lower currents) to the regulators 126a-126b, as well as the use of slower higher-voltage devices (such as IGBTs).

Figure 7:
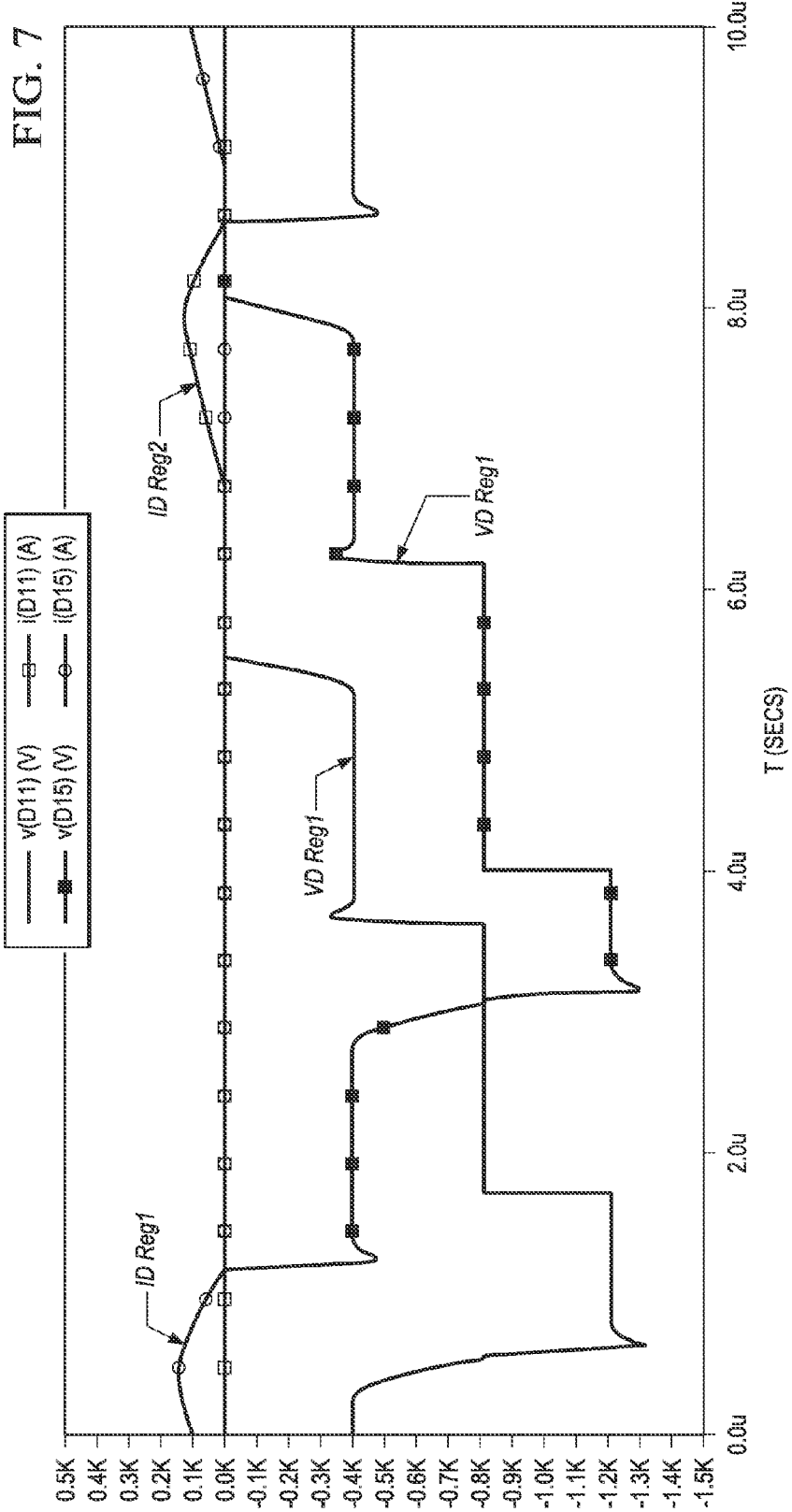
Figure 8:
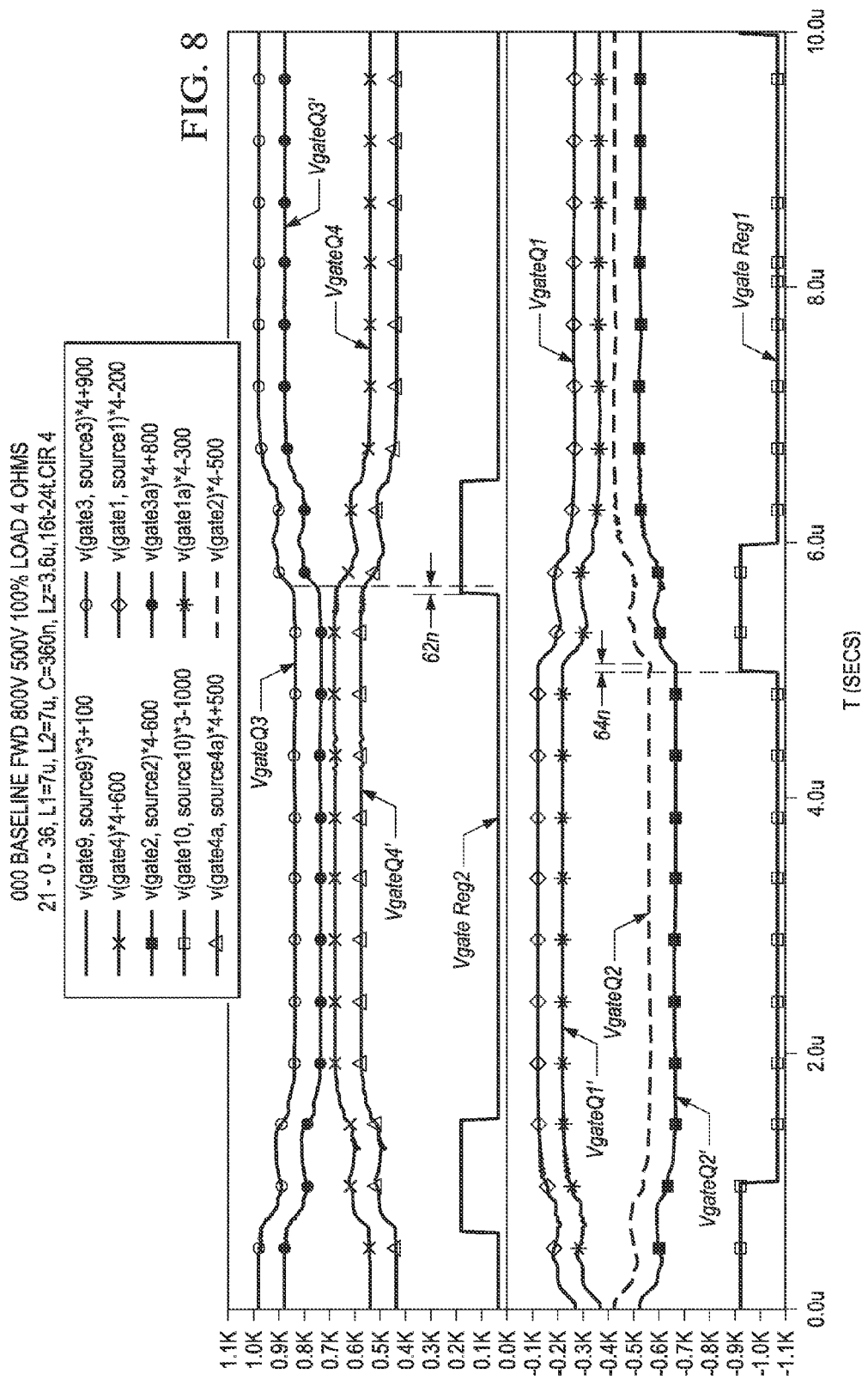
Figure 9:
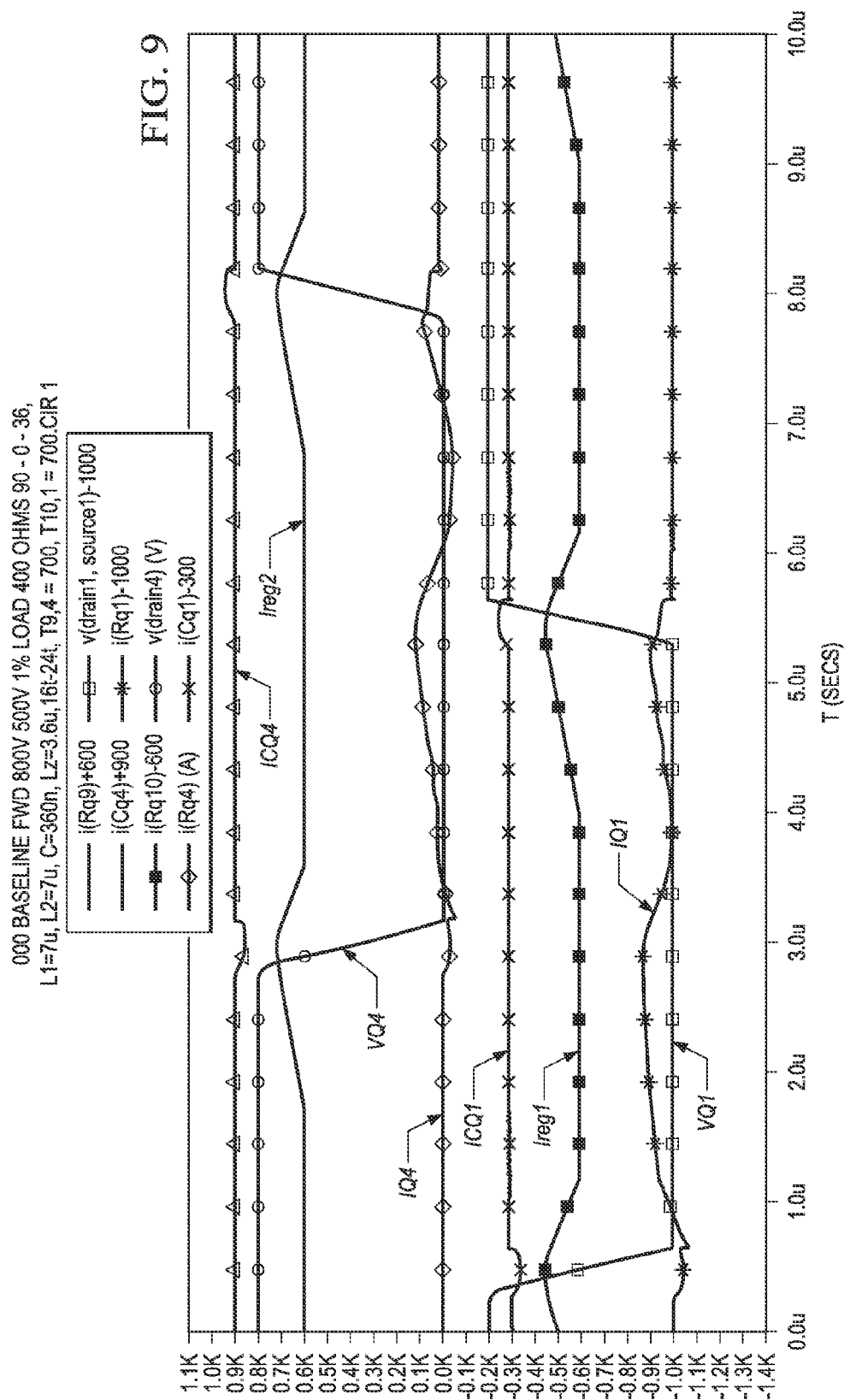
Figure 10:
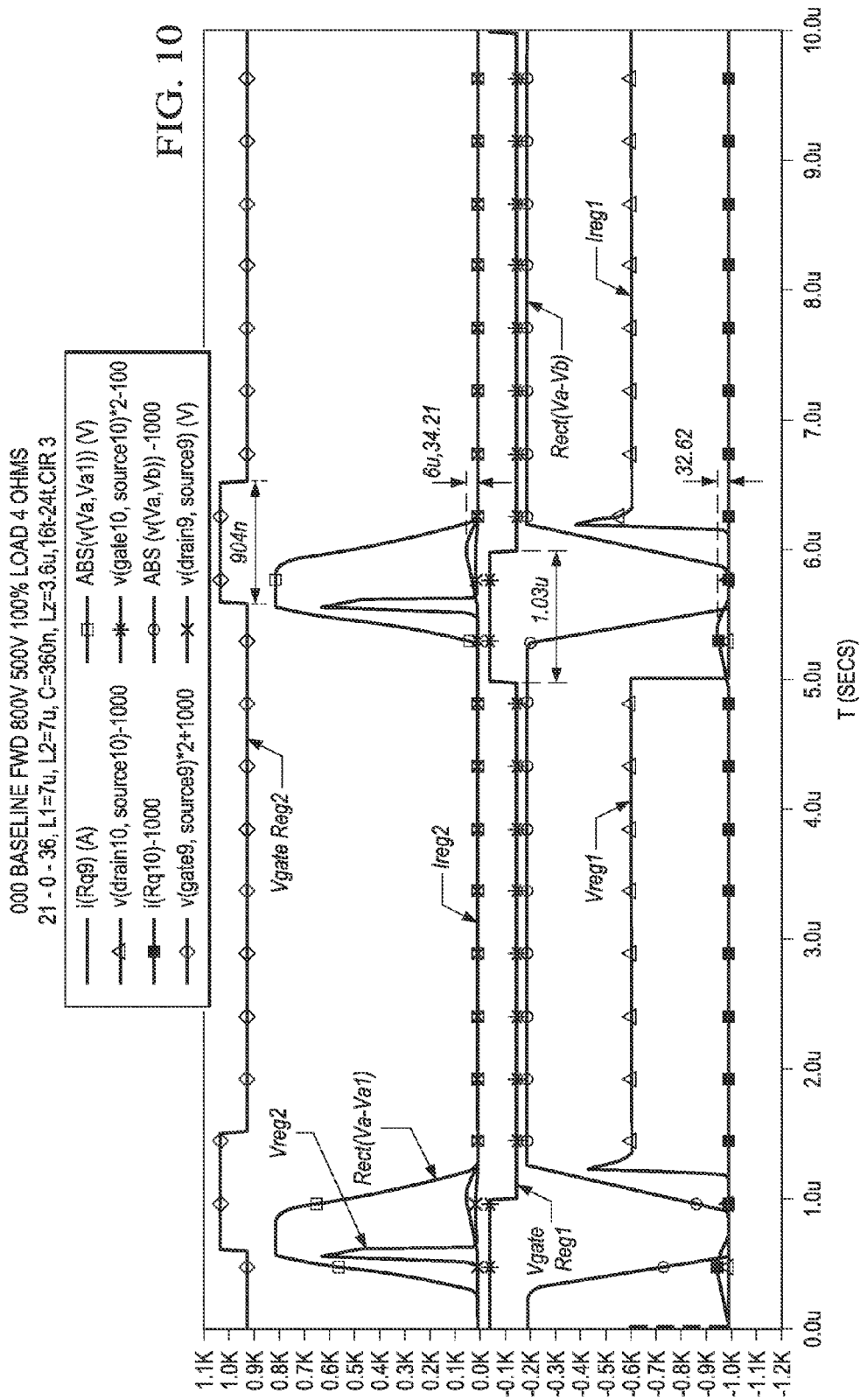
Figure 11:
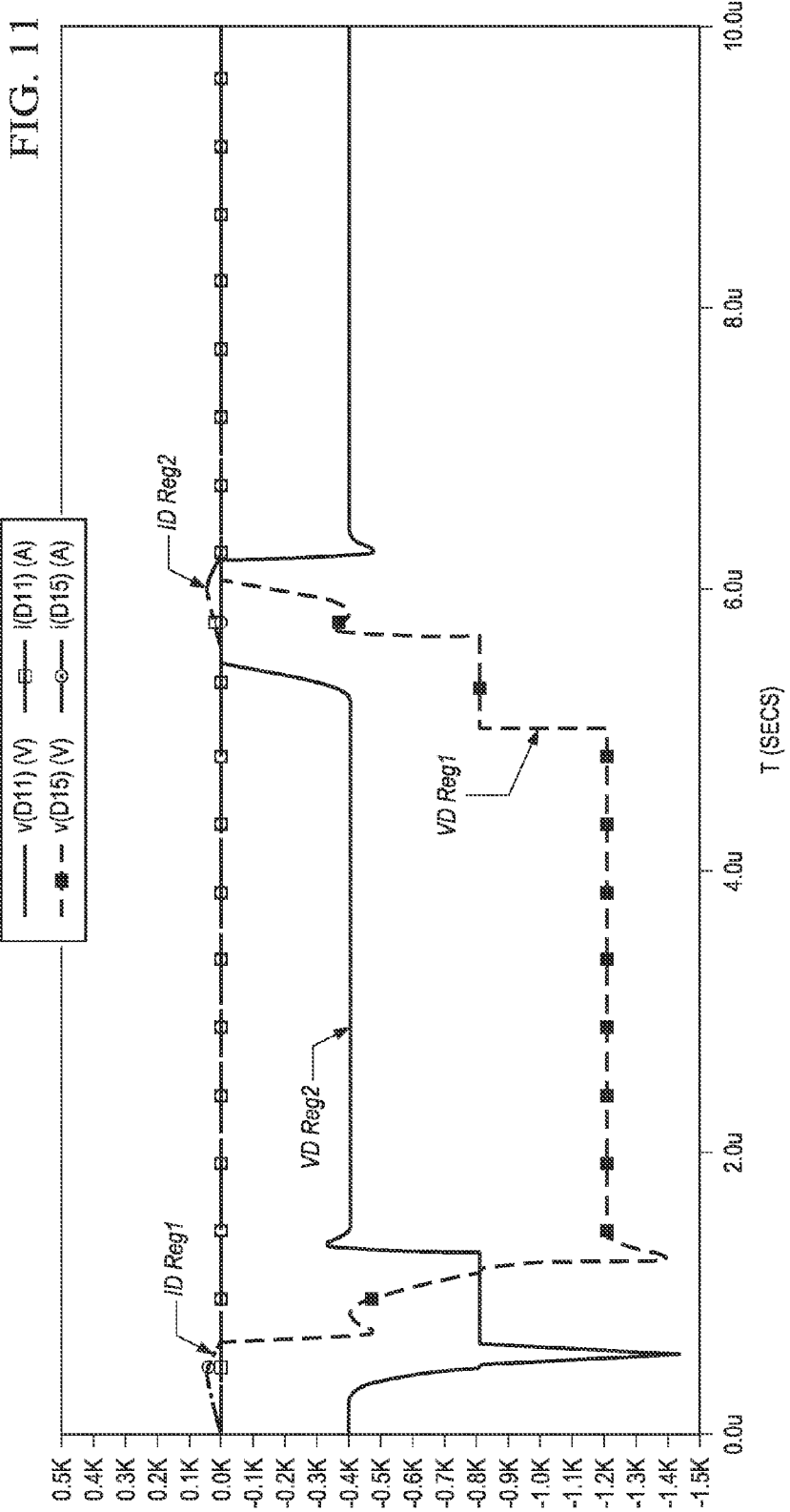
Figure 12:
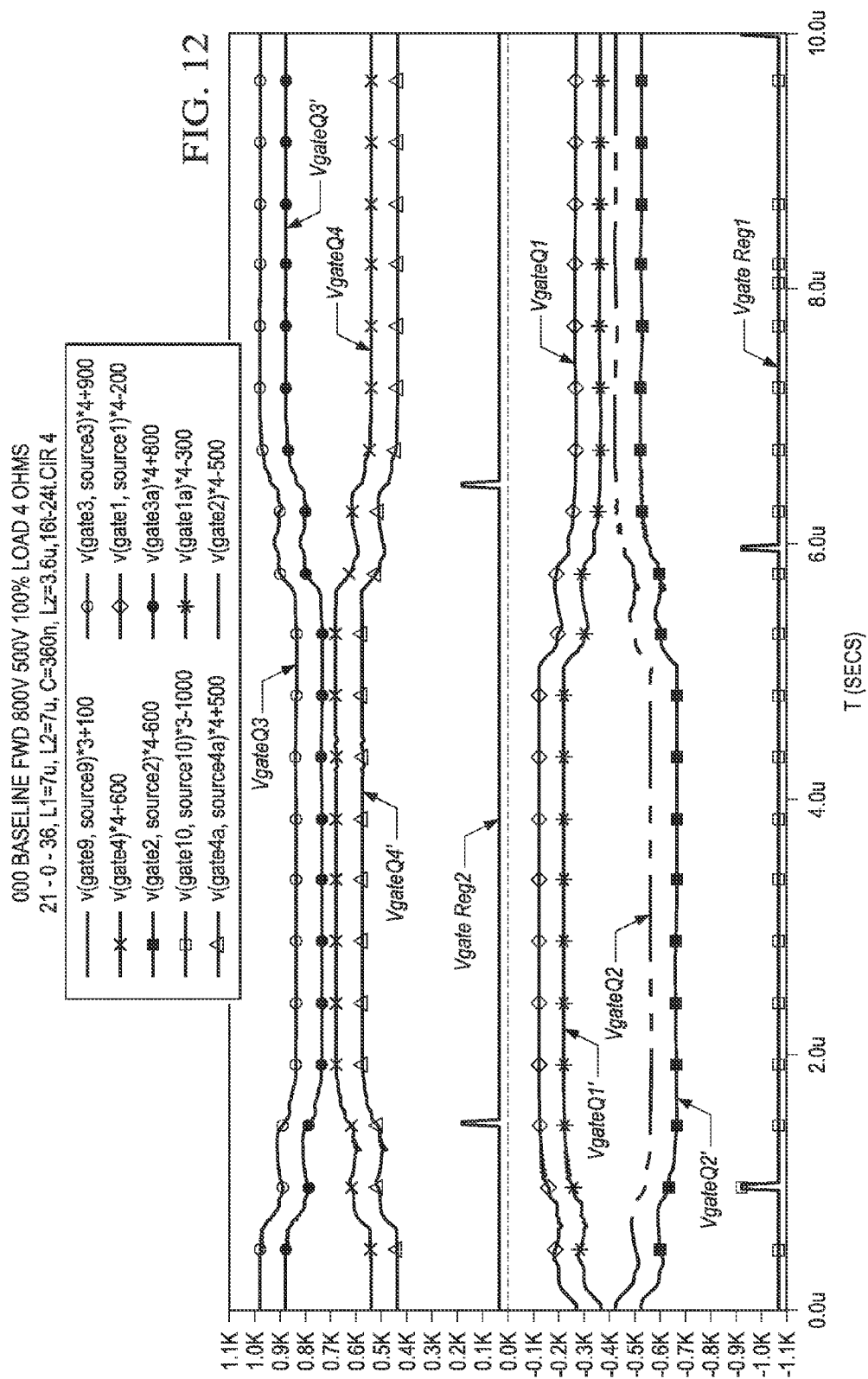
Figure 13:
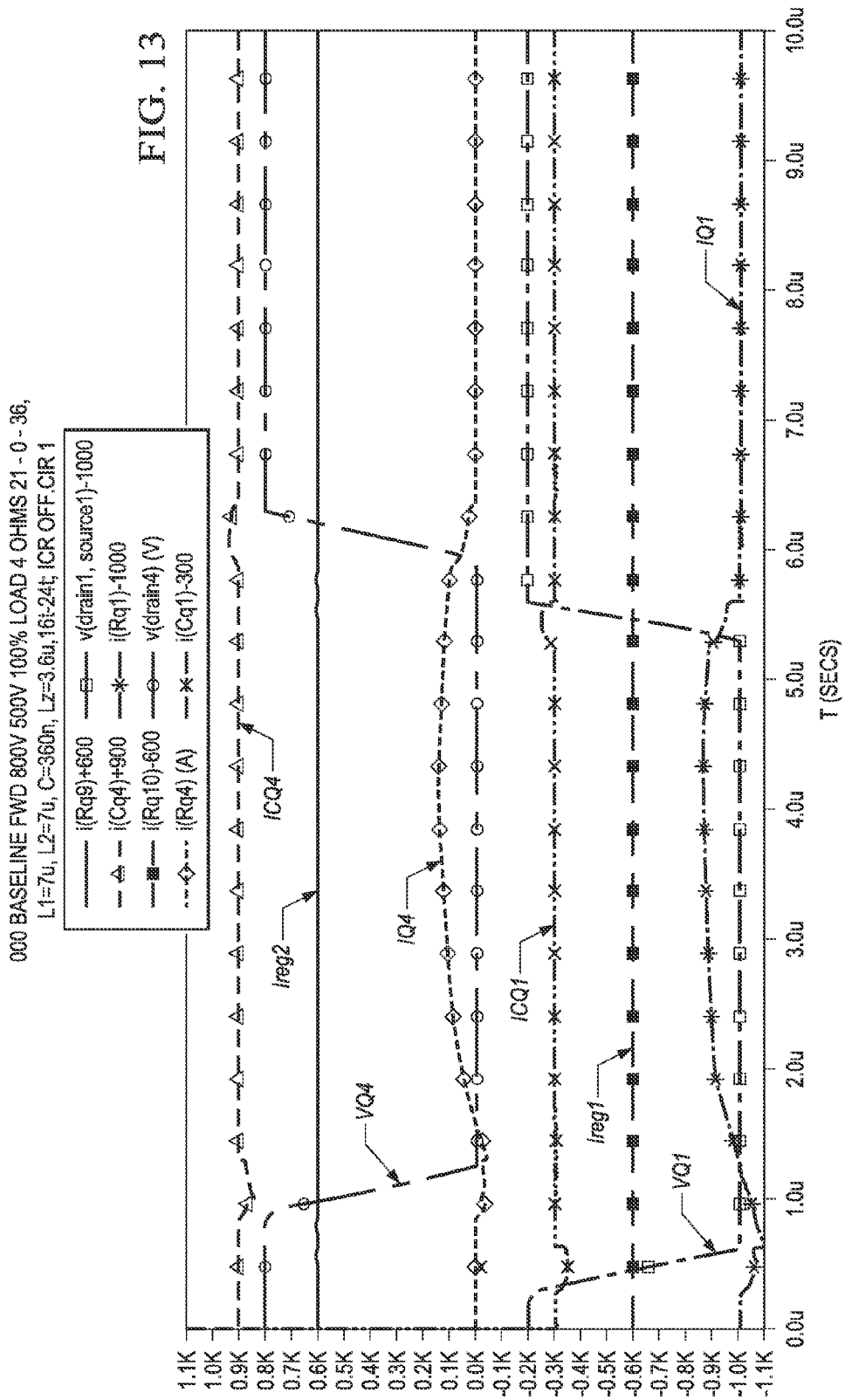
Figure 14:
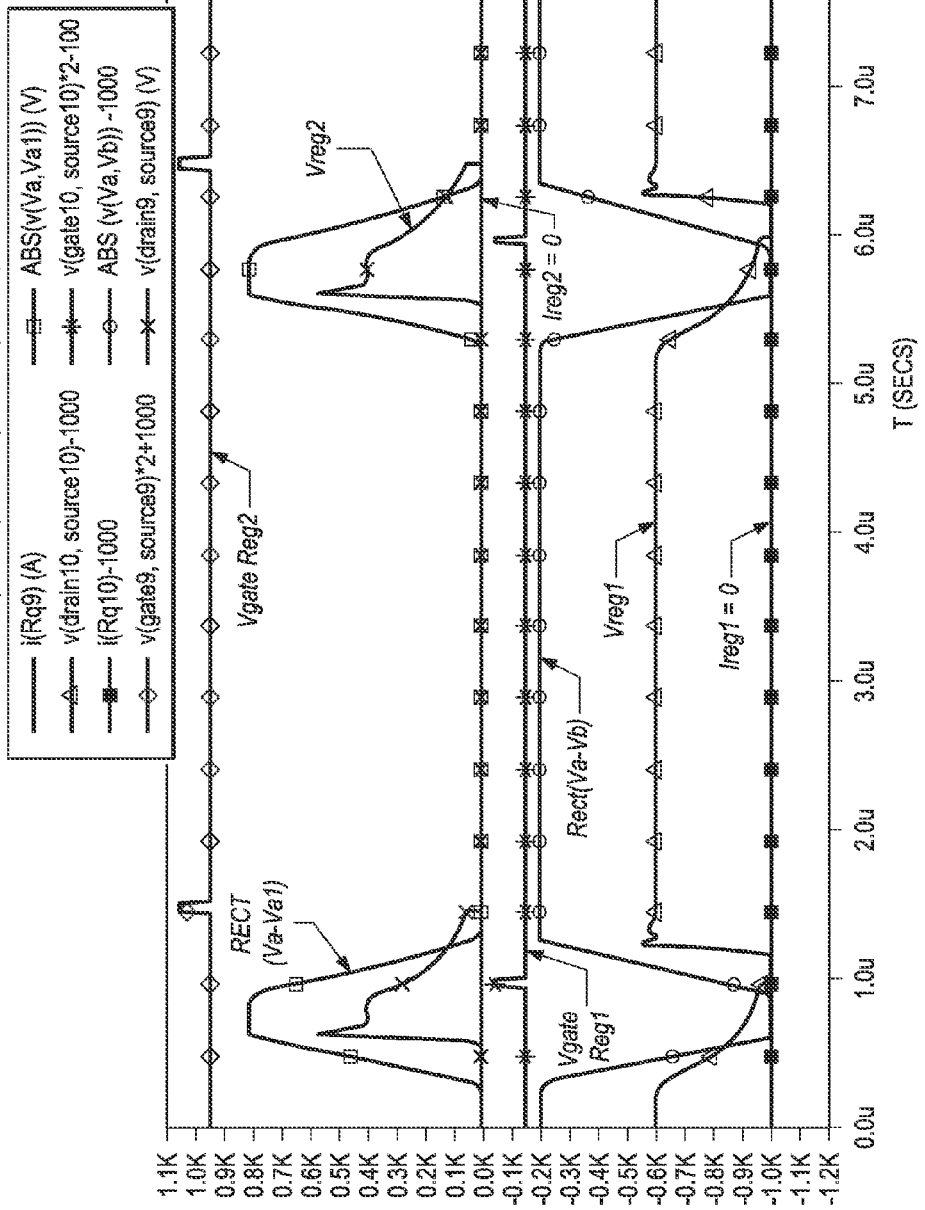
Figure 15:
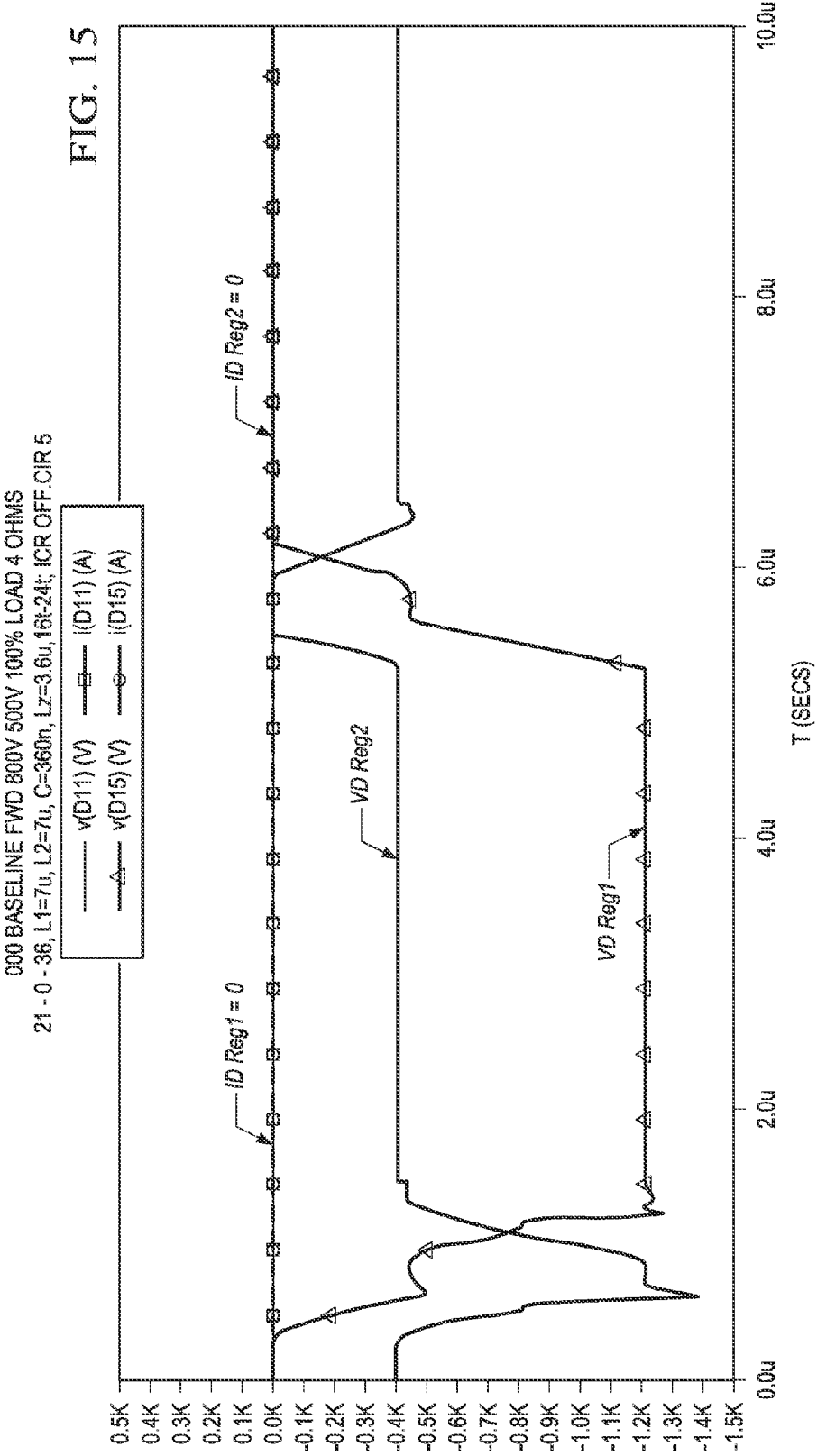

FIG. 7 illustrates operating conditions with respect to the diodes in the regulators 126a-126b under light load. Here, VDReg1 and VDReg2 represent the voltages placed on the diodes in the regulators 126a-126b, and IDReg1 and IDReg2 represent the currents through the diodes in the regulators 126a-126b. The diodes in the regulators 126a-126b can operate with near-zero losses, allowing the use of relatively slow components. Note that two avalanche-rated lower voltage components may be series-connected and used in place of the diodes to sustain the stepped-up voltage.

FIGS. 8-11 illustrate example operations of the power converter 100 and its components at full load (100%). In this case, the SRC bridges 104-106 need minimum or no ZVS assistance, and pulses in the gate signals for the transistors Qa1-Qa2 in the regulators 126a-126b are at a minimum. As expected, the magnitude of the ICR currents is reduced accordingly. This condition corresponds to increased pulse widths of the source voltage applied to the bridge diagonals ($V_{A-B}$ and $V_{A1-B1}$) and reduced pulse widths of the cross-bridge voltages ($V_{A-A1}$ and $V_{B-B1}$).

FIGS. 12-15 illustrate example operations of the power converter 100 and its components at full load with zero regulator pulse widths. In this case, the ICR currents are reduced to zero. This may occur when the ZVS assistance network is shut down to maintain high efficiency when a sufficient load current is available.

Although FIGS. 4 through 15 illustrate examples of operational characteristics of a power converter with a high efficiency ZVS assistance circuit, various changes may be made to FIGS. 4 through 15. For example, as noted above, the operational characteristics shown here are associated with a particular implementation of the power converter 100, and other implementations could be used.

Figure 16:
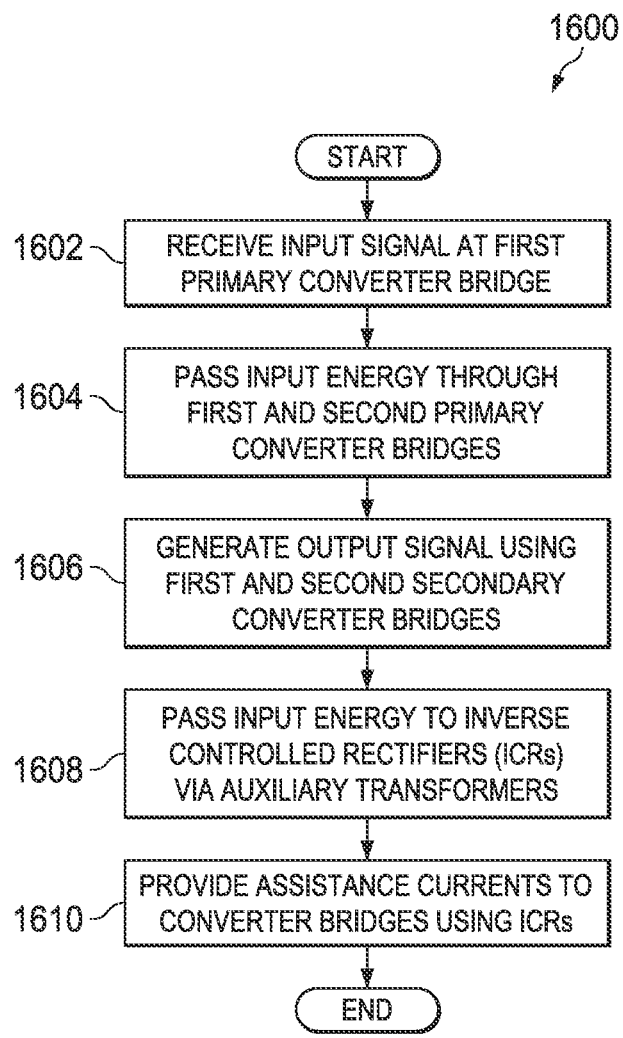
FIG. 16 illustrates an example method for performing power conversion with ZVS assistance according to this disclosure.

FIG. 16 illustrates an example method 1600 for providing ZVS assistance for a power converter according to this disclosure. As shown in FIG. 16, an input signal is received at a first primary converter bridge at step 1602. This could include, for example, providing a DC input signal to a first primary SRC bridge 104. Energy from the input signal is passed through the first primary converter bridge and a second primary converter bridge at step 1604. This could include, for example, passing energy from the DC input signal through the primary SRC bridges 104-106. This causes the generation of an output signal via first and second secondary converter bridges at step 1606. This could include, for example, generating a DC output signal using the secondary SRC bridges 116-118. Current flow can be created in the secondary SRC bridges 116-118 via main transformer windings T1-3 and T2-3.

During this time, input energy is passed from the primary converter bridges to ICRs at step 1608. This could include, for example, passing the input energy to the ICRs 120-122 via the auxiliary transformer windings Ta1-1 through Ta1-3 and Ta2-1 through Ta2-3. Assistance currents are provided to the converter bridges using the ICRs as needed at step 1610. This could include, for example, the ICRs 120-122 providing currents to the transistors 108a-114a, 108b-114b in the primary SRC bridges 104-106. As noted above, however, ICRs could alternatively or also provide currents to transistors in the secondary bridges 116-118. The regulators 126a-126b could receive pre-shaped voltages during this time to help provide substantially zero-loss operation of the ICRs 120-122.

Although FIG. 16 illustrates one example of a method 1600 for providing ZVS assistance for a power converter, various changes may be made to FIG. 16. For example, while shown as a series of steps, various steps in FIG. 16 can overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a power converter configured to convert input power into output power, the power converter comprising first and second converter bridges, each converter bridge comprising multiple transistors; and
a zero-voltage switching (ZVS) assistance circuit comprising first and second inverse controlled rectifiers (ICRs), each of the first and second ICRs configured to provide current to the transistors in the first and second converter bridges, each of the first and second ICRs comprising a rectifier connected to a regulator,
wherein the regulator in the first ICR is configured to regulate the current that is provided by the first ICR and the regulator in the second ICR is configured to regulate the current that is provided by the second ICR.

2. The apparatus of claim 1, wherein the power converter comprises two primary converter bridges and two secondary converter bridges.

3. The apparatus of claim 2, wherein the first and second converter bridges represent the primary converter bridges.

4. The apparatus of claim 2, wherein the first and second converter bridges represent the secondary converter bridges.

5. The apparatus of claim 2, wherein:
the first and second converter bridges represent the primary converter bridges; and
the ZVS assistance circuit further comprises third and fourth ICRs, each of the third and fourth ICRs configured to provide current to transistors in the secondary converter bridges.

6. The apparatus of claim 2, wherein:
the first converter bridge further comprises first and second windings of a first main transformer;
the second converter bridge further comprises first and second windings of a second main transformer; and
each main transformer further comprises a third winding configured to electrically couple one of the primary converter bridges and one of the secondary converter bridges.

7. The apparatus of claim 6, wherein:
the first and second windings of the first main transformer are coupled between two pairs of transistors in the first converter bridge; and
the first and second windings of the second main transformer are coupled between two pairs of transistors in the second converter bridge.

8. The apparatus of claim 1, wherein:
the first converter bridge further comprises a first winding of a first auxiliary transformer and a first winding of a second auxiliary transformer;
the second converter bridge further comprises a second winding of the first auxiliary transformer and a second winding of the second auxiliary transformer; and
each auxiliary transformer further comprises a third winding configured to electrically couple the first and second converter bridges and one of the ICRs.

9. The apparatus of claim 1, wherein the converter bridges comprise series resonant converter (SRC) bridges.

10. An apparatus comprising:
a power converter configured to convert input power into output power, the power converter comprising first and second converter bridges, each converter bridge comprising multiple transistors; and
a zero-voltage switching (ZVS) assistance circuit comprising first and second inverse controlled rectifiers (ICRs), each of the first and second ICRs configured to provide current to the transistors in the first and second converter bridges;
wherein the first converter bridge further comprises a first winding of a first auxiliary transformer and a first winding of a second auxiliary transformer;
wherein the second converter bridge further comprises a second winding of the first auxiliary transformer and a second winding of the second auxiliary transformer;
wherein each auxiliary transformer further comprises a third winding configured to electrically couple the first and second converter bridges and one of the ICRs;
wherein the first winding of the first auxiliary transformer is coupled across a first pair of transistors and a second pair of transistors in the first converter bridge;
wherein the second winding of the first auxiliary transformer is coupled across a first pair of transistors and a second pair of transistors in the second converter bridge;
wherein the first winding of the second auxiliary transformer is coupled between the first pair of transistors in the first converter bridge and the first pair of transistors in the second converter bridge; and
wherein the second winding of the second auxiliary transformer is coupled between the second pair of transistors in the first converter bridge and the second pair of transistors in the second converter bridge.

11. A system comprising:
a power converter configured to convert input power into output power, the power converter comprising first and second converter bridges, each converter bridge comprising multiple transistors;
a zero-voltage switching (ZVS) assistance circuit comprising first and second inverse controlled rectifiers (ICRs), each of the first and second ICRs configured to provide current to the transistors in the first and second converter bridges, each of the first and second ICRs comprising a rectifier connected to a regulator; and
a controller configured to control operation of the first and second converter bridges and the ZVS assistance circuit,
wherein the regulator in the first ICR is configured to regulate the current that is provided by the first ICR and the regulator in the second ICR is configured to regulate the current that is provided by the second ICR.

12. The system of claim 11, wherein the controller comprises:

a phase-shift modulation (PSM) controller configured to control the converter bridges; and
a pulse width modulation (PWM) controller configured to control the ZVS assistance circuit.

13. The system of claim 12, wherein:
the PSM controller is configured to generate control signals for the transistors in the converter bridges based on an input voltage, an input current, an output voltage, and an output current of the power converter; and
the PWM controller is configured to generate control signals for the regulators in the ZVS assistance circuit based on currents through the transistors in the converter bridges.

14. The system of claim 13, wherein the PWM controller is configured to apply pre-shaped voltages to transistors in the regulators to enable substantially zero-loss turn-off commutation of the transistors in the regulators.

15. The system of claim 11, wherein:
the first converter bridge further comprises first and second windings of a first main transformer;
the second converter bridge further comprises first and second windings of a second main transformer; and
each main transformer further comprises a third winding configured to electrically couple one of the first and second converter bridges to an additional converter bridge.

16. The system of claim 15, wherein:
the first and second windings of the first main transformer are coupled between two pairs of transistors in the first converter bridge; and
the first and second windings of the second main transformer are coupled between two pairs of transistors in the second converter bridge.

17. The system of claim 11, wherein:
the first converter bridge further comprises a first winding of a first auxiliary transformer and a first winding of a second auxiliary transformer;
the second converter bridge further comprises a second winding of the first auxiliary transformer and a second winding of the second auxiliary transformer; and
each auxiliary transformer further comprises a third winding configured to electrically couple the first and second converter bridges and one of the ICRs.

18. A system comprising:
a power converter configured to convert input power into output power, the power converter comprising first and second converter bridges, each converter bridge comprising multiple transistors;
a zero-voltage switching (ZVS) assistance circuit comprising first and second inverse controlled rectifiers (ICRs), each of the first and second ICRs configured to provide current to the transistors in the first and second converter bridges; and
a controller configured to control operation of the first and second converter bridges and the ZVS assistance circuit;
wherein the first converter bridge further comprises a first winding of a first auxiliary transformer and a first winding of a second auxiliary transformer;
wherein the second converter bridge further comprises a second winding of the first auxiliary transformer and a second winding of the second auxiliary transformer;
wherein each auxiliary transformer further comprises a third winding configured to electrically couple the first and second converter bridges and one of the ICRs;
wherein the first winding of the first auxiliary transformer is coupled across a first pair of transistors and a second pair of transistors in the first converter bridge;
wherein the second winding of the first auxiliary transformer is coupled across a first pair of transistors and a second pair of transistors in the second converter bridge;
wherein the first winding of the second auxiliary transformer is coupled between the first pair of transistors in the first converter bridge and the first pair of transistors in the second converter bridge; and
wherein the second winding of the second auxiliary transformer is coupled between the second pair of transistors in the first converter bridge and the second pair of transistors in the second converter bridge.

19. A method comprising:
converting input power into output power using first and second converter bridges of a power converter, each converter bridge comprising multiple transistors; and
providing current to the transistors in the first and second converter bridges using a zero-voltage switching (ZVS) assistance circuit, the ZVS assistance circuit comprising first and second inverse controlled rectifiers (ICRs) that provide the current, each of the first and second ICRs comprising a rectifier connected to a regulator,
wherein the regulator in the first ICR is configured to regulate the current that is provided by the first ICR and the regulator in the second ICR is configured to regulate the current that is provided by the second ICR.

20. The method of claim 19, further comprising:
controlling the transistors in the power converter using pulse-shift modulation (PSM) control; and
controlling regulators in the ZVS assistance circuit using pulse width modulation (PWM) control;
wherein the PWM control comprises applying pre-shaped voltages to transistors in the regulators to enable substantially zero-loss turn-off commutation of the transistors in the regulators.

* * * * *